(12) United States Patent
Gordon-Ingram

(10) Patent No.: US 7,499,827 B2
(45) Date of Patent: Mar. 3, 2009

(54) ABSOLUTE POSITION MEASUREMENT

(75) Inventor: Iain Robert Gordon-Ingram, Marshfield (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/474,005

(22) PCT Filed: Apr. 11, 2002

(86) PCT No.: PCT/GB02/01629

§ 371 (c)(1),
(2), (4) Date: Oct. 6, 2003

(87) PCT Pub. No.: WO02/084223

PCT Pub. Date: Oct. 24, 2002

(65) Prior Publication Data
US 2004/0118758 A1      Jun. 24, 2004

(30) Foreign Application Priority Data
Apr. 11, 2001    (GB) .................................... 0109057

(51) Int. Cl.
*G01C 9/00*    (2006.01)
(52) U.S. Cl. .................................................. 702/150
(58) Field of Classification Search ................. 702/150;
250/231.14, 231.16, 231.18, 237 G, 237 R,
250/231.15, 231.13; 324/207.17; 33/707,
33/706, 1 N, 1 PT; 356/616, 617, 611; 341/11,
341/13, 31, 30
See application file for complete search history.

(56) References Cited
U.S. PATENT DOCUMENTS

| | | | | |
|---|---|---|---|---|
| 4,633,224 A | * | 12/1986 | Gipp et al. ..................... 341/13 |
| 4,717,824 A | * | 1/1988 | Sakamoto et al. ......... 250/237 G |
| 4,947,166 A | * | 8/1990 | Wingate et al. ................ 341/13 |
| 5,235,181 A | * | 8/1993 | Durana et al. ........... 250/231.18 |
| 5,279,044 A | * | 1/1994 | Bremer ......................... 33/706 |
| 5,294,793 A | | 3/1994 | Schwaiger et al. | |

(Continued)

FOREIGN PATENT DOCUMENTS

DE    38 18 044 A1    11/1989

(Continued)

OTHER PUBLICATIONS

R. H. Anderson, "Close-up Imaging of document and displays with lens arrays", Applied Optics, vol. 18, No. 4, Feb. 15, 1979.

*Primary Examiner*—Tung S Lau
*Assistant Examiner*—Xiuqin Sun
(74) *Attorney, Agent, or Firm*—Oliff & Berridge, PLC

(57) ABSTRACT

An absolute measurement scale has an incremental scale with light reflecting lines alternating with non-light reflecting lines in which absolute data, in the form of discrete codewords, is embedded in the incremental scale by removing light reflecting lines. The codewords are arranged such that the scale is palindromic and cyclic. A look-up table is used to determine a coarse absolute position by comparing absolute position data extracted from the scale with absolute codewords in the look-up table. The absolute position is determined by combining the coarse absolute position with the position of the start of the first codeword in the data extracted. The absolute position may be determined to within a scale pitch by combining the absolute position with the incremental position.

28 Claims, 6 Drawing Sheets

U.S. PATENT DOCUMENTS

| | | | |
|---|---|---|---|
| 5,332,895 A * | 7/1994 | Rieder et al. | 250/231.14 |
| 5,539,993 A | 7/1996 | Kilpinen et al. | |
| 6,054,851 A * | 4/2000 | Masreliez et al. | 324/207.17 |
| 6,392,224 B1 | 5/2002 | Holzapfel et al. | |
| 6,603,115 B1 * | 8/2003 | Gordon-Ingram | 250/231.14 |
| 2001/0003422 A1 * | 6/2001 | Andermo et al. | 324/207.17 |

FOREIGN PATENT DOCUMENTS

| | | |
|---|---|---|
| DE | 44 36 784 | 4/1995 |
| EP | 0 207 121 | 7/1986 |
| EP | 0 421 024 A1 | 4/1991 |
| EP | 0 503 716 A1 | 9/1992 |
| EP | 0 871 013 A3 | 10/1998 |
| JP | A-63-71611 | 4/1988 |
| WO | WO99/08074 | 2/1999 |

* cited by examiner

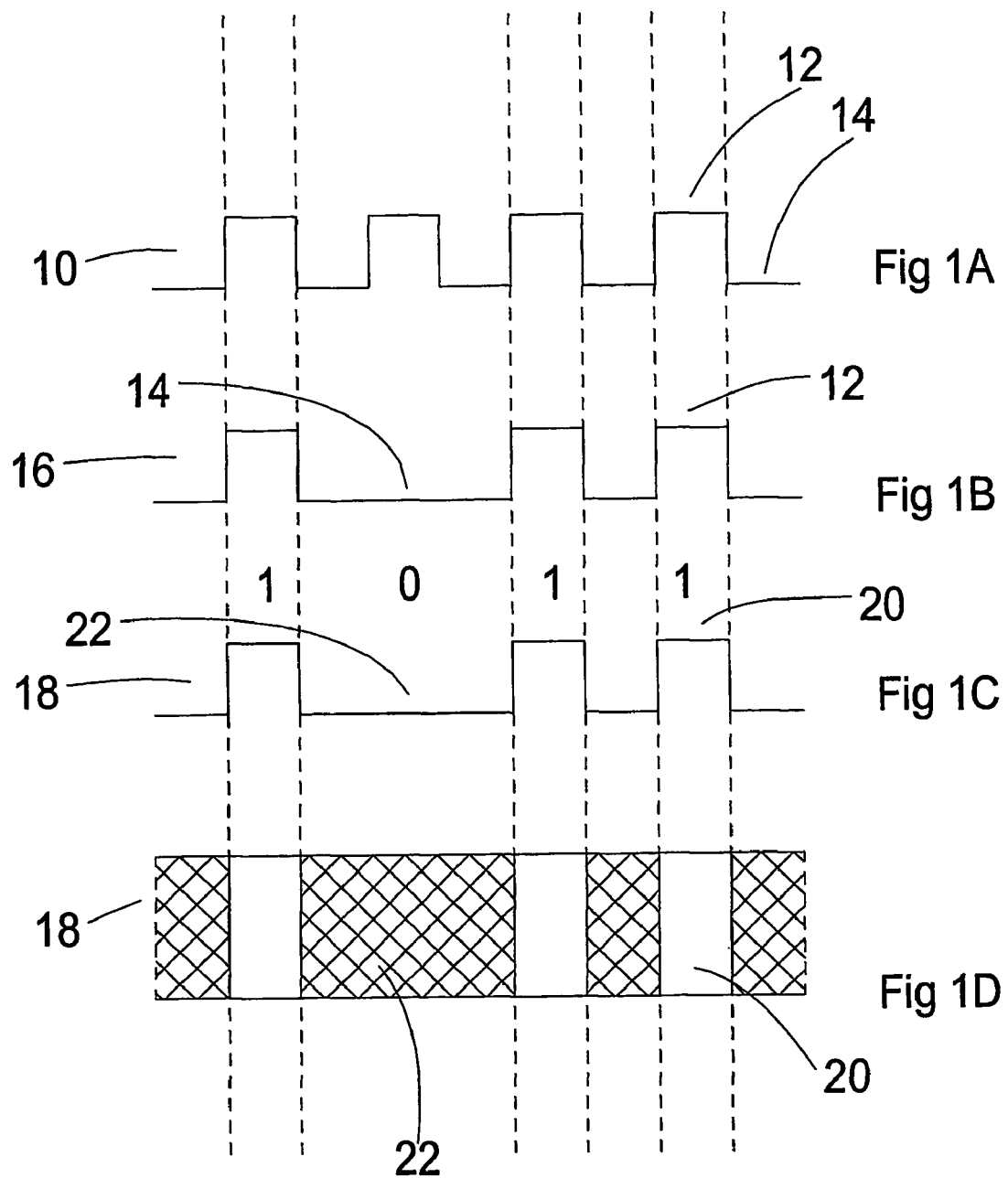

ABSOLUTE POSITION MEASUREMENT

CROSS REFERENCE

This application is a 371 of PCT/GB02/01629, filed Apr. 11, 2002.

FIELD OF THE INVENTION

The present invention relates to the measurement of the absolute position of an object.

DESCRIPTION OF PRIOR ART

An incremental position encoder is a device for measuring the relative position of two objects. Typically a scale is attached to one of the objects and a readhead to the other, the scale having regularly spaced identical markings on it. The readhead projects light onto the scale which, depending on the configuration of the scale, is then either reflected or transmitted. From the reflected or transmitted light, the readhead generates a series of signals which may be used to generate an incremental count indicative of the relative displacement of the two objects. The readhead may provide some electronic interpolation such that the resolution is higher than would be achieved by direct counting of the markings on the scale. In some cases the outputs are analogue (often two sinusoidal in quadrature) to allow electronics external to the readhead to perform the interpolation. An incremental encoder has no knowledge of the readhead's absolute position along the scale.

An absolute encoder typically comprises a scale with data written on it in the form of a pseudorandom sequence or discrete codewords. By reading this data as the readhead passes over the scale the readhead can determine its absolute position.

Hybrid incremental absolute position encoders also exist. As it is possible to make incremental encoders with finer resolution than absolute encoders, many absolute encoders also incorporate separate incremental channels. The absolute channel gives absolute position accurate to at least one period of the incremental channel. Interpolation of the incremental channel gives position within the period of the incremental channel to the desired fine resolution. Combined together, the two systems give absolute position to a fine resolution. However, as the absolute channel and the incremental channel are in separate tracks, yawing of the readhead can result in errors when combining the incremental and absolute position. Furthermore, when fixed in position the scale must be in the correct orientation such that the incremental and absolute tracks are aligned with the respective readheads.

A hybrid incremental absolute position encoder is disclosed in European Patent No. 0503716 in which the absolute channel consisting of a pseudo-random code and incremental channel are combined to form a single composite channel.

SUMMARY OF THE INVENTION

A first aspect of the present invention provides a measurement scale comprising:
 an incremental scale track comprising a series of lines having a first property, generally alternating with lines having a second property;
 characterised in that absolute position data is embedded in the incremental scale track in the form of discrete codewords.

Preferably the lines having a first property are light reflecting or light transmitting and wherein the lines having a second property are non-reflecting or non-transmitting.

Preferably extra or fewer lines are provided having one of said properties, compared to those having the other property, in patterns which form said codewords thereby embedding the absolute date in the incremental scale track. Alternatively the width or spacing of the lines in the incremental scale track are varied, thereby embedding the absolute data in the incremental scale track.

Preferably the lines having the first of second property extend substantially across the width of the scale. The absolute data on the scale may be palindromic.

The absolute data may be divided into discrete codewords, the beginning of each codeword being marked by an identical start symbol. The absolute data in both the codewords and the start symbols may consist of binary codes.

Preferably the codewords define N unique positions over a length of scale, this length being repeated such that the (N+1)$^{th}$ position is the same as the 1$^{st}$ position etc.

A second aspect of the invention provides a system for measuring absolute position comprising a measurement scale and a scale reader relatively movable with respect to each other;
 wherein the measurement scale comprises an incremental scale track with lines having a first property generally alternating with lines having a second property and absolute position data is embedded in the incremental scale track in the form of discrete codewords;
 and the scale reader includes a light source to illuminate the scale, an incremental readhead to determine the incremental position and an imaging system and a detector system to determine the absolute position.

Preferably the readhead used to determine the incremental position is a filtering readhead.

Preferably each absolute bit of data has a value of 1 or 0, wherein there is a clock bit with a value of 0 between each absolute data bit; wherein it is determined whether any bit of the scale is an absolute data bit or a clock bit by measuring the values of the (m+1)$^{th}$ bits on either side of that bit, where m=any even integer; and wherein the values of these bits are summed together, such that if the sum is smaller than a predetermined value the bit is an absolute data bit.

Preferably a look-up table is used to determine a coarse absolute position by comparing absolute position data extracted from the scale with absolute codewords in the look-up table. The absolute position may be determined to within one incremental scale pitch by combining the coarse absolute position with the position of the start of the first codeword in the data extracted by the detector system and the location of the first complete data bit in the data extracted by the detector system. The absolute position may be determined to within a fraction of the scale pitch by combining the absolute position with the incremental position.

BRIEF DESCRIPTION OF THE DRAWINGS

Preferred embodiments of the present invention will be illustrated by way of example with reference to the accompanying drawings, wherein:

FIGS. 1A–1D are schematic representations of an incremental scale, an absolute scale and a hybrid scale;

DESCRIPTION OF PREFERRED EMBODIMENTS

Figure 2A:
FIGS. 2A and 2B are schematic representations of codewords on the palindromic scale.

FIG. 1A represents a length of incremental scale 10. The incremental scale has a repeating pattern of reflective lines 12 and non-reflective lines 14. FIG. 1B shows a length of absolute scale 16. This scale also comprises reflective 12 and non-reflective lines 14 each representing a bit of absolute data which are combined to form a code to define the absolute position.

FIGS. 1C and 1D show the incremental and absolute scales of 1A and 1B combined 18. One bit of absolute data is embedded per pitch of the incremental scale. In this example the coding is binary and thus there are two possible states 1 and 0. For state 1 in the absolute scale the reflective line in the incremental scale is left in its original state 20. For state 0 the reflective line of the incremental scale is removed, as shown at 22.

Removal of parts of the incremental pattern degrade the signal from the incremental channel, however the effect is not serious if the damage is consistent along the scale. In this example reflective lines of the incremental scale are removed resulting in a drop in the incremental signal, but also a drop in the background light by the same ratio; However, if reflective lines are added instead this would result in a drop in the incremental signal by the same amount but also an increase in the background light.

Absolute data may be embedded in the incremental scale without the addition or removal of incremental lines. Instead the width of lines or the distance between lines may be varied.

As the absolute data is embedded in the incremental scale, the scale may be prismatic. This means that it is uniform along its width as seen in FIG. 1D, instead of using parallel data tracks as in previously known hybrid incremental and absolute scales. This overcomes three shortcomings of "parallel-track" systems. Firstly, it is possible for the readhead to be mounted either way round with respect to the scale. Secondly, yawing of the readhead is not so critical as there is not the need to keep parallel tracks phased relative to each other. Thirdly, there is no restriction on the lateral offset tolerance of the readhead with respect to the scale.

Figure 2B:

The absolute data embedded in the incremental scale is designed to be palindromic. This means that the absolute data on the scale is precisely the same if read from either end of the code sequence. FIG. 2A shows two codewords A and B on a scale. If the scale is rotated by 180°, as shown in FIG. 2B, the scale will be identical. Codeword B is identical to the original A and is in the same position, whilst codeword A is identical to the original B and again is in the same position. This enables a scale to be mounted on a surface in either orientation without the need for reprogramming or the need to change the orientation of the readhead.

Figure 3A:
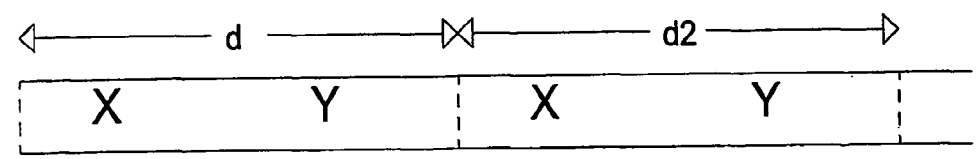
FIGS. 3A and 3B show the cyclic nature of the scale.

The absolute data on the scale defines unique positions over a certain length which may be several metres long. Beyond that length the coding repeats seamlessly so that the coding has no beginning or end. If the scale defines N unique positions along its length from start to finish, then by making the $(N+1)^{th}$ position the same as the $1^{st}$ position and, the $(N+2)^{th}$ position the same as the $2^{nd}$ position etc, the scale becomes cyclic. The length of one cycle of the scale code is known as the repeat length. Lengths of scale longer than the repeat length may be used, although positions defined along it will no longer be unique. As shown in FIG. 3A, a length of scale defines unique positions X,Y over a length d. These positions are repeated over length d2.

Figure 3B:
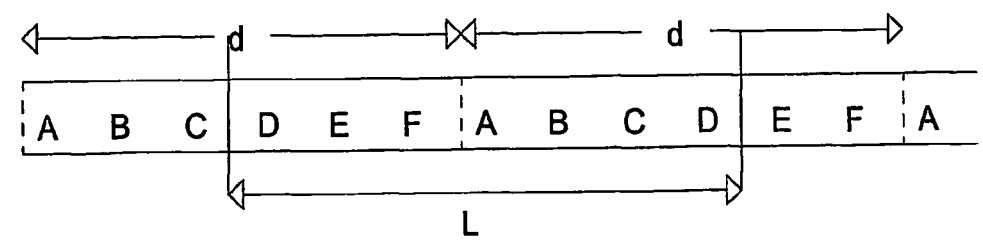

Cyclic coding enables the scale to be manufactured continuously and stocked in long lengths. Any length subsequently cut will contain valid coding over its entire length. For example, FIG. 3B shows a length of scale with a certain length d being repeated cyclically. If a length L is cut it forms a continuous scale wherever it has been cut.

There is one bit of absolute data every pitch of the incremental scale. The bits are grouped into codewords and start symbols. Each start symbol is identical and serves to mark the start of each codeword, whereas the codewords are used to define the absolute position. The choice of start symbols is constrained as the chosen sequence for the start symbol must not occur within any of the codewords otherwise part of the codeword could be misidentified as a start symbol. Furthermore, no codeword must end with the beginning of the start symbol or vice versa as this could result in the position of the codeword being misinterpreted by a few bits.

Figure 4A:
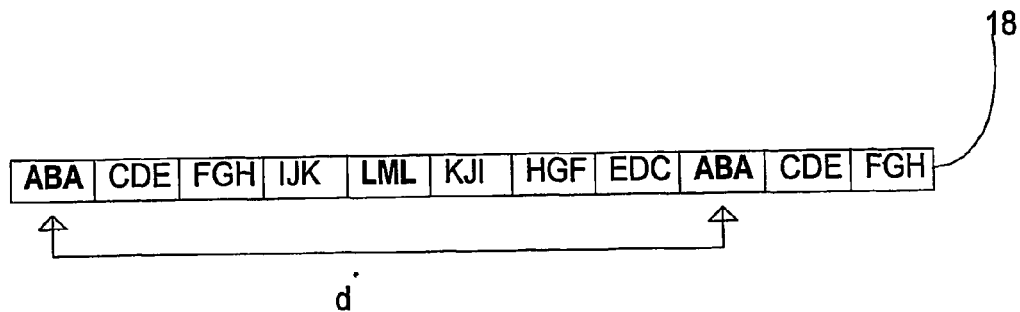
FIGS. 4A and 4B are schematic representations of the palindromic and cyclic scale with two and three palindromic codewords per repeat length respectively.
Figure 4B:
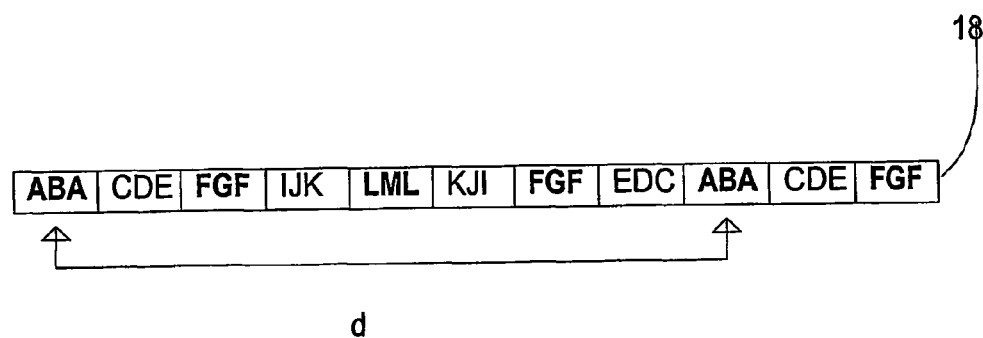

For the scale to be both palindromic and cyclic, the start symbols must also be palindromic. In addition, only two codewords within a repeat length may be palindromic without having any repeated codewords. Both scales 18 shown in FIGS. 4A and 4B are cyclic and palindromic with a repeat length d. The scale in FIG. 4A has two palindromic codewords ABA and LML without any codewords being repeated in length d. The scale in FIG. 4B has three palindromic codewords, ABA,FGF and LML. However FGF appears twice in the scale within the repeat length d.

Several strategies are employed to ensure that the codewords used do not degrade the metrological accuracy of the incremental channel. Some of these strategies involve not using codewords which badly affect the incremental signal.

The first strategy is not to use codewords which do not contain equal numbers of 1s and 0s. For example a 16-bit codeword should contain exactly eight 1s and eight 0s. This ensures that the incremental signal size remains constant as the readhead traverses the scale. It may be possible to relax this constraint to codewords having between seven and nine 1s and 0s and possibly further.

The second strategy involves not using codewords which contain a string of more than a predetermined number of 1s or 0s in a row. For example, the maximum number of 1's in a row may be six, or more preferably four. These long uniform sequences cause the incremental Lissajous, formed by two sinusoidal outputs in quadrature, to be momentarily de-centred as the readhead passes over them.

The third strategy does not involve the non-use of any codewords. To minimise the effect of the absolute data on the incremental channel, the scale must appear uniform over the length of the incremental channel's reading window which is typically 50 bits long. This is achieved by rearranging the order of codewords along the scale to ensure that any sequence of fifty consecutive bits has as near as possible the same number of 1s (or equally 0s).

The readhead used to read the scale comprises at least one light source to illuminate the scale and at least one detector to determine the incremental and absolute positions.

Figure 8:
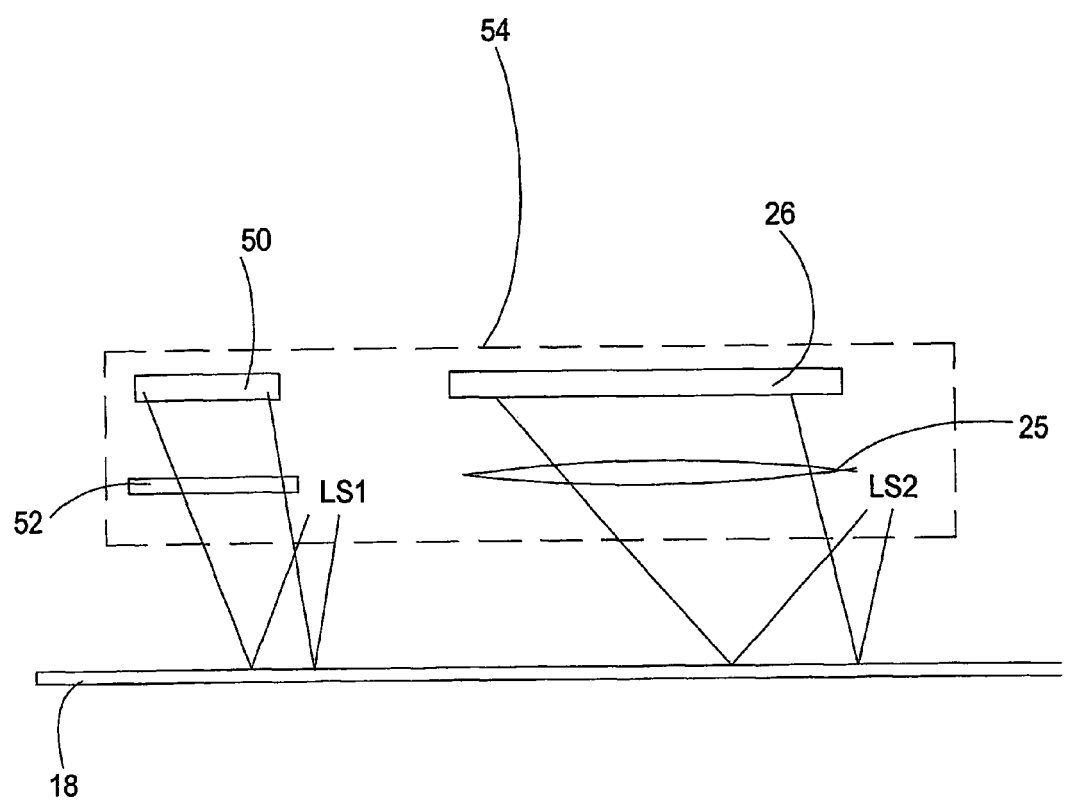
FIG. 8 is a schematic representation of the readhead and scale.

A simplified version of the readhead 54 and scale 18 is shown in FIG. 8. To read the incremental part of the scale there is provided a light source LS1, index grating 52 and detector 50 (e.g. photo diode array). To read the absolute part of the scale there is provided a light source LS2, imaging lens 25 and detector 26 (e.g. linear image sensor).

Separate detectors may be used or alternatively both detectors could be incorporated onto one chip (i.e. the same pixels detecting both the absolute and incremental positions). Likewise, common or separate light sources and lens arrays may be used.

A filtering readhead, as described in European Patent No. 0207121, is suitable for use in determining the incremental position. In such a readhead, each point on the scale produces fringes at a detector in the form of a sinusoidal wave. Each fringe at the detector is produced by many points on the scale. If parts of the scale are missing, the signal at the detector will be slightly degraded but this effect is averaged out and the frequency and sinusoidal shape remain the same. Only the base frequency of the scale is detected and harmonics, caused by missing parts of the scale, are filtered out.

Use of a filtering readhead therefore allows a non-diffraction quality scale to be used and the readhead is still able to determine incremental position to within one pitch of the scale when selected scale 10 markings are missing or added. Thus the filtering readhead is able to read the hybrid absolute and incremental scale as if it was a purely incremental scale.

An optical detector system consisting of a linear array of pixels may be used to determine the absolute position. The maximum size of each pixel is set by the Nyquist criterion, but preferably smaller pixels are used.

Figure 6:
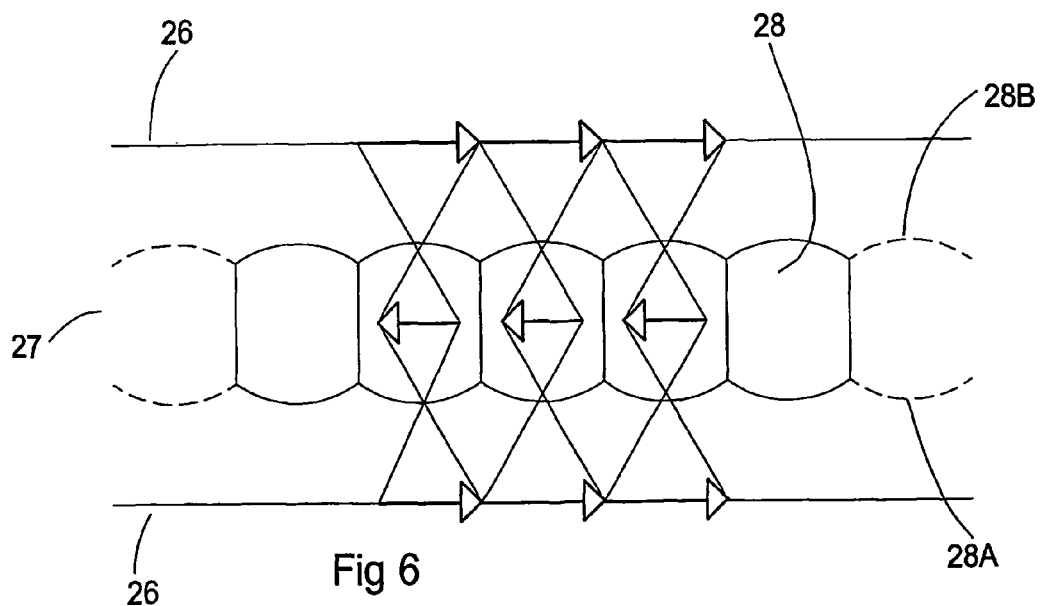
FIG. 6 is a micro lens array.

A microlens array 27, as shown in FIG. 6, may be used to image the scale 18 onto the detector 26 (e.g. the optical detector system). Each lens 28 is actually a pair of lenses 28A,28B acting as an erect imaging system to produce a continuous image. Use of a microlens array produces a much smaller working distance between the scale 18 and detector 26 than in conventional imaging systems.

The absolute data needs to be extracted from the hybrid absolute and incremental scale. A test is required to determine whether the value of any particular pixel represents a data bit or not. Absolute data is only embedded on the reflective lines of the original incremental scale. These data bits may now have a value of 0 or 1 depending on whether the reflective lines have been removed or left remaining. The original non-reflective lines on the incremental scale have remained unchanged. These have a value of 0 and are referred to as clock bits. There is a clock bit between each data bit.

Figure 5:
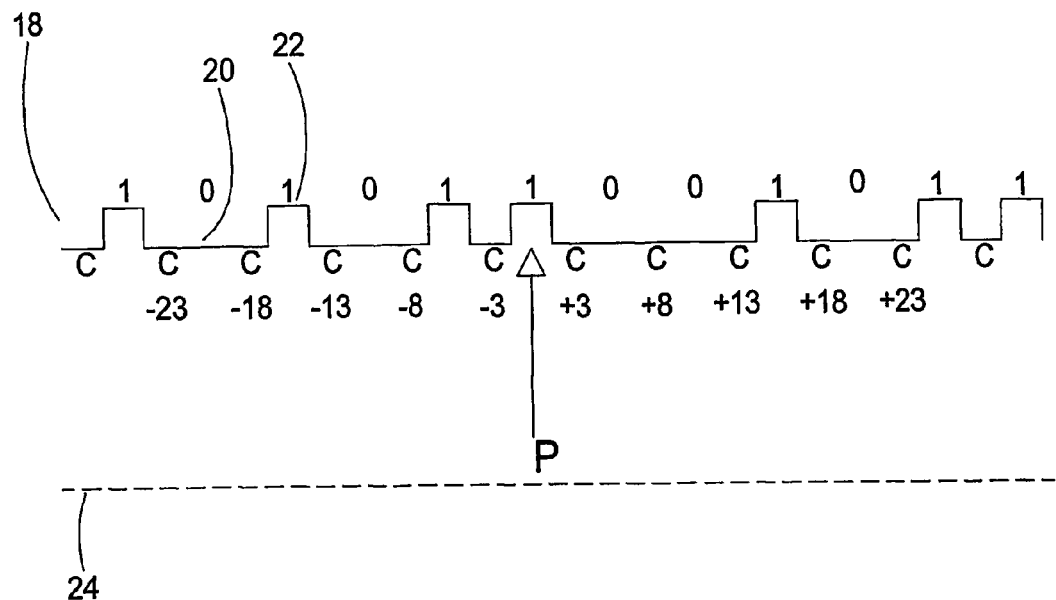
FIG. 5 is a schematic representation of a hybrid scale and a row of pixels from the imaging optics in the readhead.

A typical scale 18, as shown in FIG. 5, may have a 40 μm pitch with, for example, 5.12 pixels 24 per pitch on the detector and unity optical magnification between the scale and detector. There will therefore be either a data bit (1 or 0) or a clock bit (C) at every 2.56 pixels on the detector (i.e. every half scale pitch). If a pixel under test (P) represents a data bit then every $(m+1)^{th}$ position on either side of P will be a clock bit. Therefore there should be clock bits at the following pixel locations:

...,..., (−5×2.56), (−3×2.56), (−1×2.56), (+1×.2.56), (+3×2.56), (+5×2.56), ...,...

As fractional pixels do not exist, the following pixels should be closest to the clock data relative to the pixel under test:

−23, −18, −13, −8, −3, +3, +8, +13, +18, +23.

The values at these locations (i.e. between 1 and 0) are summed together. The lower the total the more likely the pixels are to represent clock bits and therefore the more likely the pixel under test is to represent a data bit. As the exact magnification is not known (because of variation due to the rideheight of the readhead for example), it is only useful to search for clock bits within a certain distance of the pixel under test. Searching for clock bits too far from the pixel under test may result in them being out-of-step with their true positions due to magnification errors.

It is not possible to locate the first data bit in the image by this method as it is not possible to read sufficient pixels on either side of this data bit. For the same reasoning it is not possible to locate the last data bit on the image by this method. The data bits further towards the middle of the image are determined by the above process then, assuming the magnification is constant, data bits at each end can be read out as the number of pixels between each data bit is now known.

Figure 7:
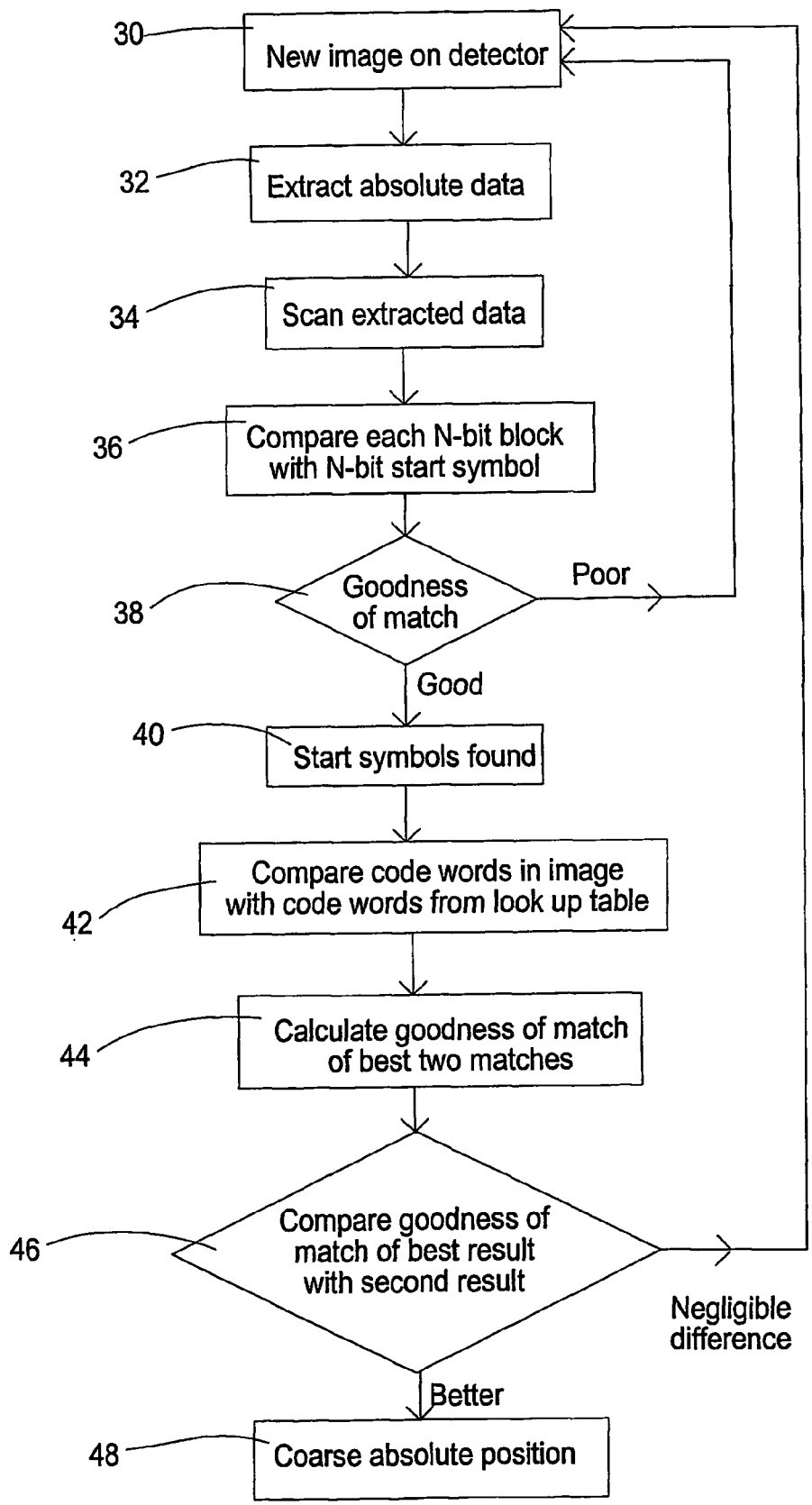
FIG. 7 is a flow diagram for the process of determining coarse absolute position.

At this stage a block of extracted data has been created. The flow diagram in FIG. 7 summarises how the coarse absolute position may be determined from the extracted absolute data. This block of extracted absolute data 32 should contain a little over 4 codewords of data and at least 3 start symbols. Each start symbol is identical and in this example is 9 bits long. The extracted data is scanned 34 and every 9-bit block is compared with the start symbol sequence 36. The goodness of match of a 9-bit block of data is determined by inverting each bit of the data block if its corresponding bit in the start symbol sequence is 1. The values of all 9 bits in the block are summed and the result is the goodness of match 38, the lower the value the better the match. If the start symbols are not correctly spaced (i.e. with exactly one codeword between each start symbol) then the image must be corrupted. In this case the image is discarded and the process restarts from the beginning with a new image 30.

Once the start symbols have been found 40, the locations of three complete codewords in the extracted data are calculated. This may be done by the use of a look-up table permanently stored in the readhead's memory which is used to decode the three codewords. Each series of three consecutive words in the look-up table is compared with the three words from the image 42. In each case a goodness of match is calculated 44 in the same way as for calculating the start symbols. The best match position in the look-up table gives the coarse absolute position of the readhead. The goodness of match coefficient of the second best match is also stored and this coefficient is then used to determine the trustworthiness of the coarse position 46. If the best match is only marginally better than the second best match then the reported coarse position is untrustworthy. Whereas if the best match was much better than the second best match the degree of confidence is higher. Thresholds can be applied to this value to determine whether the readhead uses the data to calculate the coarse absolute position 48 or scraps the result and starts again with a new image 30.

Assuming that the data is deemed to be sufficiently trustworthy, the final step is to calculate the absolute position. Four pieces of data are required. These are (a) the coarse position from the look-up table (to the nearest codeword on the scale), (b) the position of the start of the first word in the extracted data (to the nearest scale pitch), (c) the position of the start of the first complete data bit in the original image (to the nearest detector pixel) and (d) the phase of the Lissajous from the incremental channel (to the unit of resolution).

(a) and (b) are sufficient to calculate the absolute position of the readhead to the nearest scale pitch. (d) is used to determine the position within one scale pitch to the required final resolution. However it is possible to get a position error of one scale pitch from this information alone. (c) contains sufficient information to check for this and correct the position if necessary.

This invention may be carried out using a light-transmissive scale instead of a light-reflective scale.

Although this embodiment describes a linear scale and readhead, this invention could also be suitable for a rotary scale or a two-dimensional scale.

Furthermore, the scale is not limited to binary coding. Multi-level coding may also be used. For example if the scale comprises a glass plate with chrome deposited on it, the code could be produced by leaving clear glass for the clock bits, using half-density chrome for the "0" data bits and full-density chrome for the "1" data bits. Alternatively the "0" data bits may comprise dotted lines and the "1" data bits may comprise solid lines.

This invention would also be suitable for non-optical scales, for example capacitive or magnetic scales.

What is claimed is:

1. A measurement scale comprising:
   a single incremental scale track comprising a series of lines having a first property, and generally alternating lines having a second property;
   wherein an absense or presence of the lines from the incremental scale track having either the first property or the second property produce patterns which form codewords, thereby embedding absolute data in the incremental scale track in the form of discrete codewords.

2. A measurement scale according to claim 1 wherein the lines having a first property are light reflecting or light transmitting and wherein the lines having a second property are non-reflecting or non-transmitting.

3. A measurement scale according to claim 1 wherein the lines having the first or second property extend substantially across the width of the scale.

4. A measurement scale according to claim 1 wherein the absolute data on the scale is palindromic.

5. A measurement scale according to claim 1 wherein the beginning of each codeword is marked by a start symbol, each start symbol being identical.

6. A measurement scale according to claim 1 wherein the codewords define N unique positions over a length of scale, this length being repeated such that the (N+1)th position is the same as the $1^{st}$ position.

7. A measurement scale according to claim 1 wherein the absolute data consists of binary codes.

8. A measurement scale according to claim 7 wherein each codeword has substantially the same number of 1's and 0's.

9. A measurement scale according to claim 7 wherein each codeword only contains strings of six or less continuous 1's or 0's.

10. A measurement scale according to claim 7 wherein the codewords are arranged such that within any length of scale of predetermined length there are substantially the same number of 1's.

11. A measurement scale according to claim 1 wherein the presence or removal of the lines is capable of producing a same number of lines.

12. A measurement scale according to claim 1 wherein both incremental and absolute data can be obtained from the same track.

13. A system for measuring absolute position comprising a measurement scale and a scale reader relatively movable with respect to each other;
   wherein the measurement scale comprises an incremental scale track with a series of lines having a first property generally alternating with lines having a second property;
   wherein an absence or presence of the lines from the incremental scale track having either the first property or the second property produce patterns which form codewords, thereby embedding absolute data in the incremental scale track in the form of discrete codewords;
   and the scale reader includes a light source to illuminate the scale, and at least one detector to determine the incremental position and the absolute position from said incremental scale track.

14. A system for measuring absolute position according to claim 13 wherein the lines having a first property are light reflecting or light transmitting and wherein the lines having a second property are non-reflecting or non-transmitting.

15. A system for measuring absolute position according to claim 13 wherein the at least one detector includes a filtering readhead that determines the incremental position.

16. A system for measuring absolute position according to claim 13 wherein the at least one detector comprises a linear array of pixels.

17. A system for measuring absolute position according to claim 13 wherein a microlens array is used to image the scale onto the at least one detector.

18. A system for measuring absolute position according to claim 13 wherein:
   each absolute bit of data has a value of 1 or 0;
   wherein there is a clock bit with a value of 0 between each absolute data bit;
   wherein it is determined whether any bit of the scale is an absolute data bit or a clock bit by measuring the values of the $(m+1)^{th}$ bits on either side of that bit, where m=any even integer;
   and wherein the values of these bits are summed together, such that if the sum is smaller than a predetermined value the bit is an absolute data bit.

19. A measurement system according to claim 13 wherein the beginning of each codeword is marked by a start symbol, and wherein the identification of the start symbols on the scale is used to locate the absolute codewords on the scale.

20. A system for measuring absolute position according to claim 13 wherein a look-up table is used to determine a coarse absolute position by comparing absolute position data extracted from the scale with absolute codewords in the look-up table.

21. A system for measuring absolute position according to claim 20 wherein:
   the goodness of match between the codeword in the look-up table and the codeword extracted from the scale is determined by:
   comparing the sequence of an n-bit block of extracted data with the n-bit codeword in the look-up table;
   wherein each bit of extracted data whose corresponding bit in the codeword in the look-up table is 1 is inverted;
   and wherein the values of the n bits of extracted data are summed together;
   such that if the summed value is low, the match is good.

22. A system for measuring absolute position according to claim 20 wherein the absolute position may be determined to within one incremental scale pitch by combining the coarse absolute position with the position of the start of the first codeword in the data extracted by the at least one detector and the location of the first complete data bit in the data extracted by the at least one detector.

23. A system for measuring absolute position according to claim 22 wherein the absolute position may be determined to within a fraction of a scale pitch by combining the absolute position with the incremental position.

24. A system for measuring absolute position according to claim 13 wherein one detector determines the incremental position and the absolute position.

25. A system for measuring absolute position according to claim 13 wherein the at least one detector includes an incremental readhead to determine the incremental position and an imaging system and a detector system to determine the absolute position.

26. A system for measuring absolute position according to claim 13 wherein the presence or removal of the lines is capable of producing a same number of lines.

27. A system for measuring absolute position according to claim 13 wherein the incremental scale track is a single incremental scale track and the scale reader includes the light source to illuminate the incremental scale track, and the at least one detector to determine the incremental position and the absolute position from the incremental scale track.

28. A system for measuring absolute position according to claim 13 wherein both incremental and absolute data can be obtained from the same track, and the scale reader includes the light source to illuminate the incremental scale track, and the at least one detector to determine the incremental position and the absolute position from the incremental scale track.

* * * * *